United States Patent [19]
Brussmann et al.

[11] 3,948,834
[45] Apr. 6, 1976

[54] POWDER COATING AGENTS

[75] Inventors: Otto Brussmann, Lambsheim; Felix Miksovsky, Ludwigshafen; Rolf Fikentscher, Ludwigshafen; Horst Diefenbach, Ludwigshafen, all of Germany

[73] Assignee: Badische Anilin- & Soda-Fabrik Aktiengesellschaft, Ludwigshafen (Rhine), Germany

[22] Filed: Aug. 28, 1973

[21] Appl. No.: 392,250

[30] Foreign Application Priority Data
Aug. 29, 1972 Germany............................ 2242456

[52] U.S. Cl............ 260/27 R; 260/31.6; 260/42.43; 260/42.52; 260/47 EP; 260/75 T; 260/79.3 R; 260/79.7; 260/80.75; 260/86.1 N; 260/89.5 N; 260/901
[51] Int. Cl.² ........................................ C08F 27/00
[58] Field of Search....... 260/80.75, 86.1 N, 89.5 N, 260/27, 901, 79.3 R

[56] References Cited
UNITED STATES PATENTS

| | | | |
|---|---|---|---|
| 3,198,770 | 8/1965 | Watkins | 260/80.75 |
| 3,458,485 | 7/1969 | Craig | 260/80.75 |

*Primary Examiner*—Harry Wong, Jr.
*Attorney, Agent, or Firm*—Johnston, Keil, Thompson & Shurtleff

[57] ABSTRACT

A pulverulent coating agent which consists of a mixture of:
A. a compound having at least two aziridine ring groupings per molecule;
B a binder which contains hydroxyl groups and which is solid at ambient temperature; and optionally
C one or more other additives.

The coating agent is particularly suitable for powder coating metal surfaces.

8 Claims, No Drawings

POWDER COATING AGENTS

The present invention relates to powder coating agents based on mixtures of aziridine compounds and binders containing hydroxyl groups which may be used for conventional powder coating methods.

It is known that both thermoplastic and crosslinkable powder coating agents can be prepared. For this purpose a binder, hardener, pigment and other additives are mixed and dispersed, for example by homogenization by fusion. The cooled melt is subjected to grinding and screening to convert it into a powder which as a rule consists of particles of a diameter of less than 90 microns.

Epoxide resins, acrylate resins and polyester resins are generally used as binders for the production of crosslinkable powder coating agents.

Coating agents based on acrylate resins or polyester resins may be crosslinked for example by way of N-alkoxymethyl groupings or by way of free hydroxyl groups with blocked polyisocyanates. These agents yield when baked cleavage products produced by the crosslinking reaction. Thus for example formaldehyde and the corresponding alcohol are partly released into the atmoshpere when crosslinking via N-alkoxymethyl groups. when crosslinking is carried out with blocked polyisocyanates, the blocking agent liberated in the thermal dissociation escapes in part into the atmosphere. Although emission from these systems is much less than in the case of coating agents containing solvent, up to 5% of volatile constituents always escapes in the baking process.

It is an object of the present invention to provide a powder coating agent which is stable in storage, which permits application practically free from emission and which gives coatings having good flexibility.

This object can surprisingly be achieved by using a mixture of a compound containing at least two aziridine groupings per molecule with a binder containing hydroxyl groups which is solid at ambient temperature.

According to the present invention a powder coating agent consists of a mixture of:

A. at least one compound having at least two aziridine groupings in the molecule; and
B. at least one binder which is solid at room temperature, which contains hydroxyl groups and which may contain other reactive groups; with or without
C. at least one additive conventionally used in the surface coatings industry.

Those agents according to the invention are particularly preferred which contain as component (A) at least one compound of the general formula:

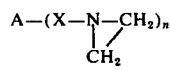

in which $n$ is one of the integers from 2 to 6; X is one of the groupings: —NHCO—, —CO—, —SO$_2$— or —O—CO—; and A is alkyl, aryl, aralkyl, or a cycloaliphatic or heterocyclic radical of up to twenty carbon atoms whose valence is equal to n, and which contains as component (B) at least one acrylate resin having a hydroxyl number of from 30 to 250 or a polyester having a hydroxyl number of from 30 to 250.

Coating agents according to the invention may be prepared by a conventional method, for example by fusion homogenization followed by grinding or screening. They have a long shelf life and when baked give practically no cleavage products. Coatings prepared from them not only have good flow and good gloss but also good flexibility.

Details will now be given regarding the ingredients which go to make up powder coating agents according to the invention:

A. Aziridine compounds suitable as component (A) include low molecular weight and polymerized compounds containing per molecule at least two aziridine groupings of the general formula:

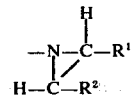

in which R$^1$ and R$^2$ may be identical or different and are hydrogen or linear or branched alkyl of one to four carbon atoms.

Examples of the suitable aziridine compounds are 1. compounds of the general formula:

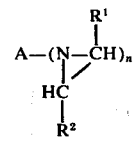

in which $n$ is one of the integers 2 and 3;

R$^1$ and R$^2$ have the meanings given above; and

A is alkyl, aryl, aralkyl, or a cycloaliphatic or heterocyclic radical, as for example:

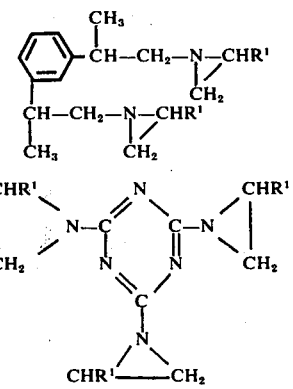

R$^1$ in each case being methyl or preferably hydrogen;

2. compounds of the general formula:

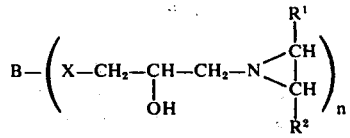

where R$^1$ and R$^2$ have the meanings given above, $n$ is one of the integers from 1 to 6, B is alkyl, aryl, aralkyl, or a cycloaliphatic or heterocyclic radical or a polyalkylene glycol ether group with one to fifty units and X is oxygen, sulfur, or nitrogen or may be missing, as for example

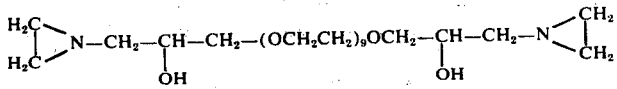

3. compounds of the general formula:

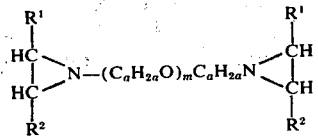

where $R^1$ and $R^2$ have the above meanings, $a$ is 2, 3 or 4, $m$ is one of the integers from 1 to 50, as for example

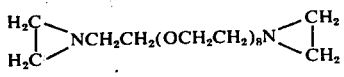

4. compounds of the general formula:

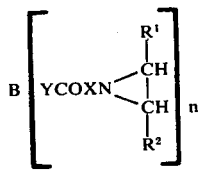

where $R^1$ and $R^2$ have the above meanings, $n$ is one of the integers 2 to 6, X is a linear or any branched alkylene of two to six carbon atoms, B is alkyl, aryl, aralkyl, or a cycloaliphatic or heterocyclic radical or a polyalkylene glycol ether group with 1 to 50 units and Y is oxygen, sulfur, nitrogen of NH, as for example:

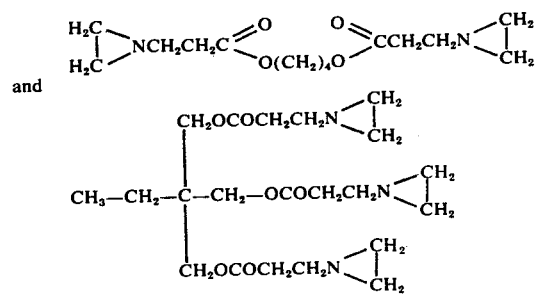

5. compounds of the general formula:

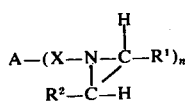

where $R^1$ and $R^2$ have the above meanings, n is one of the integers from 2 to 6, X is one of the groupings: —NHCO—, —CO—, —SO$_2$— or —O—CO— and A is alkyl, aryl, aralkyl, or a cycloaliphatic or heterocyclic radical whose valence equals n, for example:

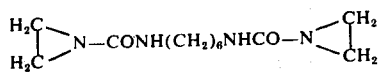

Aziridine compounds of the type specified under (5), particularly those having two or three aziridine radicals attached to the grouping —NHCO—, are preferred as components (A) in the coating agents according to the invention.

The following components (A) are also suitable:

6. compounds of the general formula:

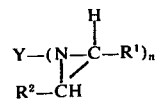

where $R^1$ and $R^2$ have the above meanings, Y is a divalent —CO—, —SO$_2$— or —SO— radical or a high valence boron, P=S or P=O radical and n accordingly is 2 or 3, as for example:

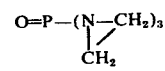

Mixtures of the said aziridinyl compounds and polymers and polycondensates with aziridinyl groups are similarly suitable.

As already mentioned above the formula of the grouping:

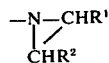

includes substituted and unsubstituted aziridines.

Examples of suitable aziridines of this type are also described in U.S. Pat. Nos. 3,157,607, 3,171,826, 3,182,040, 3,198,770, 3,295,916, 3,316,210, 3,337,533, 3,378,535, 3,393,184, 3,507,837, 3,549,378, 3,507,839, 2,596,200 and 3,197,463; DOS 1,494,290 and 1,444,275; DAS 1,270,389, 1,209,097 and 1,470,321; in German Patents 880,740 and 872,037; in French Patent 1,427,431; In Belgian Patents 708,173, 702,436, 650,991 and 646,325; and in British Patents 1,054,635 and 1,003,385.

Component (A) is contained in the mixture in accordance with the invention in an amount of from 1 to 50% by weight based on the sum of the components (A) and (B). Component (A) is preferably combined with component (B) in such amounts that aziridine and hydroxyl groups are present in about equivalent amounts. In some cases it may be convenient however to use an excess or deficiency of up to 50% of the equimolar amount.

B. Components (B) include binders containing hydroxyl groups which are solid at ambient temperature and have a hydroxyl number of more than 10. It generally proves to be advantageous to use a binder which has a hydroxyl number of from 30 to 250 and preferably of from 50 to 200. These values may be exceeded in special cases.

The hydroxyl groups may be attached to aliphatic, cycloaliphatic or aromatic radicals.

The binder may contain not only hydroxyl groups but also a minor amount of other reactive groups, as for example carboxyl groups, epoxide groups, amino groups, SH-groups and other groups.

Component (B) of the powdered coating agents according to the invention is preferably a polymer based on an ester of acrylic and/or methacrylic acid with an alcohol of one to eight carbon atoms and/or a vinylaromatic which contains as the component containing hydroxyl groups a monoester of acrylic or methacrylic acid with a polyhydric and preferably a dihydric alcohol such as for example hydroxyethyl acrylate, hydroxypropyl acrylate, hydroxybutyl acrylate and/or a corresponding methacrylate, and also allyl alcohol, vinylthioethanol, N-methylolacrylamide and/or N-methylolmethacrylamide and other copolymerizable compounds containing hydroxyl groups as polymerized units. These polymers containing hydroxyl groups may also contain polymerized units of monomers having other functional groups such as for example acrylic acid, methacrylic acid, acrylamide, methacrylamide and/or glycidyl acrylate or methacrylate. The reactivity of (B) in relation to (A) may be controlled to a certain extent with these monomers.

Polyesters containing hydroxyl groups derived from polybasic carboxylic acids or their esterifiable derivatives and polyhydric alcohols, for example based on isophthalic acid or terephthalic acid, hexanediol or trimethylolpropane have also proved to be very suitable as components (B).

Epoxide resins, for example reaction products from bisphenol A and epichlorohydrin, which contain free hydroxyl groups may however also be used as components (B).

The binder (B) containing hydroxyl groups may be prepared by a conventional polymerization or polycondensation process.

Mixtures of different binders containing hydroxyl groups may also be used as components (B).

The components (B) may be used in an amount of from 99 to 50%, particularly from 90 to 60%, by weight based on the sum of the components (A) and (B); it is preferably however to use such an amount of (B) that the amount of hydroxyl groups contained in the binder is about equivalent to the aziridine groups contained in component (A).

C. If desired the coating agents of the invention may contain as component (C) other additives conventionally used in the surface coatings industry. Examples of suitable additives of this type are: inorganic or organic pigments in amounts of up to 100% based on the sum of components (A) and (B), as for example titanium dioxide, carbon black or iron oxide pigments; fillers as for example kaolin or bentonite; and also in minor amounts soluble dyes such as for example Rhodamin; flow improvers as for example silicones, small amounts of curing catalysts as for example organic acids (monocarboxylic, dicarboxylic and polycarboxylic acids or their anhydrides), inorganic acids, amine salts and all conventional alkylating agents, and of these it is preferred to use solid products. A small amount of a solvent, as for example glycol acetate, may be present. Moreover other natural or synthetic surface coating resins which are solid at ambient temperature, as for example rosin, cellulose derivatives, phenolic resins or melamine resins, may be used.

For the production of the powdered coating agent the components (A) and (B) with or without (C) are mixed and homogenized and dispersed in conventional apparatus, for example in screw extruders, in the melt, generally at a temperature of from 80° to 110°C. After cooling the melt is comminuted by a conventional method, for example ground and screened, so that a coating agent is obtained having a particle size of for example less than 90 microns.

The components (A), (B) and (C) may also be mixed or dispersed in suitable solvents. The solid products may then be obtained either by precipitation in a suitable precipitant, for example water, or by removal of the solvent in vacuo, by freeze drying or in a devolatilizing extruder, the coating agent then being obtained by drying (if necessary), grinding and screening.

Powder coating agents according to the invention may be applied to a surface to be coated by methods conventionally used in powder coating, such as by electroless deposition and flame spraying, preferably by electrostatic powder spray or fluidized bed coating. Suitable equipment is described for example in Journal of Paint Technology, Vol. 44, No. 570 (1972), pages 35 to 56.

Powder coating agents according to the invention may be baked at from 130° to 220°C and preferably at from 140° to 190°C. The baking period depends on the baking temperature and as a rule is from 5 to 60 minutes and preferably from 10 to 40 minutes.

Coating agents according to the invention are suitable for coating metal, glass, concrete, ceramics, plastics and wood; they are preferred for coating metal surfaces, as for example of iron or aluminum.

It is surprising that the coating agents according to the invention give completely crosslinked products on simple heating.

It is a special advantage of the coating agents according to the invention that during the baking process practically none of the cleavage products produced by the crosslinking reaction are given off into the atmosphere. Unlike powder coating agents based on epoxide resins they exhibit very good resistance to weather.

The powder according to the invention is outstandingly free-flowing. The coatings prepared from it exhibit good flow and good flexibility.

Naturally the coating agent according to the invention may be dissolved in suitable surface coating solvents, for example glycol acetate, and processed by conventional methods as coating agents containing solvents.

The following Examples illustrate the invention. The parts and percentages specified in the Examples are parts by weight and percentages by weight.

EXAMPLE 1

238.5 parts of a copolymer from 50 parts of styrene, 20 parts of methyl methacrylate, 10 parts of butyl acrylate, 19.5 parts of butanediol monoacrylate and 0.5 part of acrylic acid, having a K value (according to H. Fikentscher, Cellulosechemie, 13, 58 (1932)) of 23 (1% in ethyl acetate) and a softening point (according to DIN 53,180) of 98°C, and 41.5 parts of hexamethylene-bis-N-ethylenurea and 120 parts of titanium dioxide (rutile) are premixed in a tumbler mixer and dispersed and homogenized in a screw extruder, for example a Buss Ko-kneader, at 95°C casing temperature with a dwell time of about two minutes. The cooled melt is comminuted, ground twice and screened through a sieve having a 90 μ mesh. The fraction smaller than 90 microns is used for the following tests:
a. shelf life at 40°C;
b. weight loss in thirty minutes at 200°C;
c. testing of surface coating properties.

EXAMPLE 2

230.6 parts of the copolymer from Example 1, 49.4 parts of an adduct of 1 mole of isophorone diisocyanate and 2 moles of ethylenimine and 120 parts of titanium dioxide (rutile) are mixed, ground and homogenized as described in Example 1. Testing is carried out as in Example 1.

EXAMPLE 3

230.5 parts of a copolymer from 31 parts of styrene, 40 parts of methyl methacrylate, 10 parts of butyl acrylate and 19 parts of hydroxypropyl acrylate, which has a K value of 23 and a softening point of 106°C, 41.5 parts of hexamethylene-bis-N-ethylenurea and 120 parts of titanium dioxide (rutile) are mixed, ground and homogenized as described in Example 1. Testing is carried out as in Example 1.

EXAMPLE 4

228 parts of a copolymer from 31 parts of styrene, 36 parts of methyl methacrylate, 3 parts of butyl acrylate, 26 parts of hydroxypropyl acrylate and 4 parts of acrylic acid having a K value of 18.4 (1% in ethyl acetate) and a softening point of 105°C, 52 parts of N,N'-bis-2-ethyleniminoethyloxalamide and 120 parts of titanium dioxide are mixed, ground and homogenized as described in Example 1. Testing is carried out as in Example 1.

The powder coating agents prepared according to Examples 1 to 4 remain stable in storage after having been stored for 48 hours at 40°C and after having been stored for 30 minutes at 200°C they show a loss in weight of less than 0.5% (thermogravimetric analysis).

Production of coatings

The powder is applied to deep drawing sheet steel by means of a commercial electrostatic powder spraygun at a potential difference of 80 kilovolts and baked for thirty minutes at 180°C. Coatings having a thickness of from 50 to 60 microns thus obtained exhibit good flow, good gloss, good adhesion and Erichsen values of 6 to 8 mm.

Comparison with prior art a. a powder coating agent from 214 parts by weight of an acrylate resin containing hydroxyl groups and having an OH number of 80, a K value of 25 and a softening temperature (DIN 53,180) of 100°C, 66 parts by weight of an adduct of 1 mole of isophorone diisocyanate and 2 moles of ε-caprolactam and also 120 parts by weight of titanium dioxide exhibits a loss in weight of 4% within 30 minutes at 200°C.

b. a powder coating agent from 280 parts of an acrylate resin containing polymerized units of 25 parts by weight of N-butoxy-methylmethacrylamide (K value 27, softening temperature 98°C) and 120 parts by weight of titanium dioxide shows a loss in weight of 3.9% within 30 minutes at 200°C.

We claim:

1. A powder coating agent which comprises a mixture of
A. at least one compound of the formula:

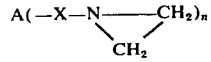

in which $n$ is one of the integers from 2 to 6, X is one of the groupings —NHCO—, —CO—, $SO_2$— or —O—CO— and A is alkyl, aryl, aralkyl, or a cycloaliphatic or heterocyclic radical whose valence is equal to $n$; and
B. a binder which is solid at ambient temperature and which contains hydroxyl groups, said binder being an acrylate resin having a hydroxyl number of from 30 to 250 based on an ester of acrylic and/or methacrylic acid with an alcohol of one to eight carbon atoms, said component A being contained in the mixture in an amount of from 1 to 50% by weight based on the sum of the components (A) + (B); said coating being designed to be applied to a surface by electrostatic powder spray or fluidized bed coating techniques.

2. A powder coating agent as claimed in claim 1 wherein component (A) and component (B) are combined with each other in such amounts that the aziridine groups and the hydroxyl groups are present in about equivalent amounts.

3. A powder coating agent as claimed in claim 1 wherein component (B) has a hydroxyl number of from 50 to 200.

4. A powder coating agent as claimed in claim 1 wherein component (B) contains in addition to the hydroxyl groups at least one other reactive group from the group consisting of carboxyl, epoxide, amide and SH groups.

5. A powder coating agent as claimed in claim 1 which contains as component (C) at least one substance from the group consisting of inorganic pigments, organic pigments, fillers, flow improvers, curing catalysts, solvents, natural coating agent resins and synthetic coating agent resins.

6. A powder coating agent as claimed in claim 1 wherein component (B) is a copolymer of styrene, methyl methacrylate, butyl acrylate, and a monoester of acrylic or methacrylic acid with a dihydric alcohol.

7. A coating obtained from a coating agent as claimed in claim 1.

8. A coating obtained from a coating agent as claimed in claim 5.

* * * * *